Patented Nov. 2, 1937

2,097,591

UNITED STATES PATENT OFFICE 2,097,591

METHOD OF TREATING GREEN COFFEE BERRIES

Sam Everett Finley, Atlanta, Ga., assignor of one-third to Robert D. Kneale, Atlanta, Ga.

No Drawing. Application June 20, 1936, Serial No. 86,347

2 Claims. (Cl. 99—68)

This invention relates to a method of treating green coffee berries to prepare them for use in the making of beverages.

Heretofore it has been the common practice to roast the green berry, thereafter grind the same and package this ground coffee for the market. Likewise, the green berry has been roasted and shipped in such roasted condition to the retailer or consumer to be ground as required for use. In both cases, however, the green berry has been roasted whole and ground after roasting.

Prolonged research and experimentation have convinced me that the practice of roasting the whole berry is not fundamentally sound. For example, a quantity of green berries is commonly placed in a roasting apparatus of any one of several forms, but all exteriorly heated, so that the heat for the roasting operation is derived from the wall of the roasting chamber of the apparatus. In other words, the wall of the roasting chamber is heated and serves to transmit heat to the berries which are agitated to bring successive portions of the berries into contact with such walls. The structure of the berry is of a fibrous, cellular nature and is inherently an insulator against the passage of heat therethrough. It therefore follows that, when sufficient heat has been supplied to the exterior of the berry to penetrate into the interior or heart thereof, the surface strata or layers of the berry are over-roasted or burned before the heart of the berry is properly roasted. It is not only theoretically, but practically impossible to roast the berry throughout its entire body to a uniform degree. The result is that, when the exterior portion of the berry is roasted to the desired extent, the interior portion thereof is unroasted.

It is well recognized by experts in the art that under-roasting fails to produce the desired taste, while over-roasting drives off aromatic oils, so highly essential to palatability, and brings out the bitter principle of the berry, rendering the same unpalatable. The best that is possible under prior known methods is to produce an intermediate condition wherein the exterior of the berry is over-roasted slightly and the heart of the berry is similarly unroasted, so as to produce generally fair conditions, in the aggregate. As a matter of actual practice, the general tendency is to roast the exterior of the berry to the proper extent, leaving the heart of the berry appreciably under-roasted. There is little uniformity in prior practice, so far as roasting is concerned, and it is certain that in no case are whole beans uniformly roasted throughout.

I have found that a uniformly roasted product may be obtained by finely dividing the green berry and thereafter roasting the resulting particles in separated condition and free from static contact with one another, to insure the uniform subjection of all portions of the divided particles to substantially the same heat treatment. In practice, I preferably apply this heat to the particles under treatment by transmitting the heat to said particles from an atmosphere of gas surrounding them, rather than by contact with heated surfaces which, at best, only make point contacts with the material under treatment.

In one preferred way of practising the invention, the green berry is broken up or ground into finely divided particles of the desired size, that is, coarse-ground for coffee pot, fine ground for the percolator, pulverized for the drip-coffee apparatus, and even smaller subdivisions for mechanical suspensions and solutions. The particles are then introduced into a suitable treating chamber, such as a rotary oven or kiln and tumbled or cascaded through a heated gaseous medium maintained at the desired temperature. As the particles are thus cascaded through the heated gaseous medium, they are roasted thereby until properly browned or toasted. This roasting operation may be carried on at atmospheric pressure, but is preferably accomplished under pressure for it is found that, when an increased pressure is employed, more of the aromatic oils will be retained and the time of roasting shortened.

It should be understood in this connection that the duration and temperature employed are important in the roasting of coffee, for primary requisites of good coffee are taste and aroma. These depend largely upon the aromatic oils contained in the green berry. Such oils are of volatile character and care must be exercised during roasting or they will not be conditioned to impart the desired fragrance or taste to the coffee, or will be driven off and lost.

When an attempt is made to roast the whole bean as heretofore stated, with attendant over-roasting of the exterior portion of the berry, it is found that a large portion of these aromatic oils are dissipated, while those oils at the heart of the berry are not sufficiently treated to produce the desired taste or aroma in the beverage to be made therefrom. Practical evidence of the amount of these essential oils which are lost under present practice is found in the vicinity of any present-day coffee roasting house for the air over large areas is filled with the pleasant aroma of these aromatic oils which have passed through the stack.

In accordance with the present invention, in contradistinction, the green berry is divided into such relatively fine sub-divisions that the roasting heat is enabled to quickly permeate these particles and uniformly roast them in a minimum duration of time. The aromatic oils are not freed instantaneously, but require some little time to be volatilized and driven off. According to the present invention, it is possible to carry on the roasting of the small particles with sufficient rapidity to obtain uniform roasting and before appreciable amounts of the aromatic oils are volatilized and dissipated. In other words, by effecting a rapid roasting, under a uniform heat treatment, in a heated atmosphere, I obtain uniform roasting throughout the individual particles with satisfactory heat treatment of the aromatic oils, but without serious loss of such oils. If the roasting is accomplished under pressure the time of treatment is shortened and the loss of such oils minimized.

There are various ways in which the heated roasting gaseous atmosphere can be maintained. For example, the method may be carried out within a sealed chamber which may be provided therein with an appropriate agitator for cascading the particles, or the chamber may rotate or be otherwise moved to bring about the agitation referred to. The heating of the gas within the container may be by an electric coil, steam coils or other appropriate source of heat, suitably shielded to preclude direct contact of the coffee particles with the heating element, or the heating element may be exteriorly of the roasting chamber and the roasting gases may be circulated through the chamber and into contact with the heating element. Other ways of accomplishing this result will be apparent, but the foregoing are illustrative. If the roasting is done under pressure, an appropriate safety vent should be provided to preclude the building up of excess pressures.

It may be here noted that certain tests, made in connection with the roasting of whole berries in accordance with prior commercial practice, showed that they lost considerably more weight during the roasting operation than the weight of the water which analysis had shown to be present in the berries prior to such operation. This clearly demonstrated that not only the water had been driven off, but also some of the other constituents of the berry, including appreciable parts of the essential oils. The loss of the aromatic oils was apparent from the attendant odor.

In contradistinction, when the process of the present invention was practised, as hereinbefore described, it was found that the loss of weight during the roasting operation did not run higher than the water content as shown by the analysis of the berry before roasting, and there were relatively little attendant odors, showing that the aromatic oils were being preserved.

Coffee made from berries, treated in accordance with the method as described, has a delightful cereal flavor not found in beverages prepared from berries roasted under former methods. It has a highly pleasing fragrance, aroma and taste and there is a pronounced absence of that bitter principle heretofore so frequently found in coffee beverages and particularly in strong coffee.

I am aware that it has heretofore been suggested to grind green coffee beans into the desired size, thereafter pack a quantity of the ground beans in a perforated metal package, thereafter roast the ground beans, while thus contained in the metal package, and later effect infusion by immersing the metal package in hot water. With such suggested method the roasting is attempted with a quantity of ground coffee packaged within a metal package containing sufficient coffee to make a cup of beverage. This of course pre-supposes that each package will contain approximately one tablespoon of ground roasted coffee. I have found that ground green coffee cannot be properly roasted if packaged, as stated, for the same reason that it is impossible to properly uniformly roast the whole bean. It requires quite a number of whole beans in order to produce a tablespoon of ground coffee and if it is impossible to uniformly roast a single bean, because of the insulating character of the bean fibre, it will be manifest that a compacted mass of many beans will furnish an even greater insulation against the passage of heat to its center than is found in a single bean. In other words, the possibility of uniformly roasting a compacted mass of ground particles of individually heat insulating character and in closely confined static contact with one another is more remote than the uniform roasting of a single bean, which experience has shown to be impossible.

An important feature of the present invention, in its preferred form, consists, as hereinbefore stated, in cascading or agitating the particles, so that they are separated and free from static contact with one another during treatment and can be individually enveloped in the roasting medium and thus individually subjected to a quick roasting operation.

I have hereinbefore referred to the gaseous atmosphere which serves as the roasting medium in the preferred method of carrying out this invention. This gaseous medium may be atmospheric air or a gas of any appropriate kind or a mixture thereof. If a gas is to be used I preferably employ an inert gas.

In the foregoing specification I have set forth the preferred, practical embodiment of the invention wherein the particles are roasted by enveloping them individually within a roasting atmosphere, so that the heat of roasting is derived from the gaseous atmosphere. This I consider to be the best practice under the present invention. However, the advantage of quick roasting of finely divided coffee can be obtained by contact of the coffee with the heated surface, while the coffee is in finely divided form, and in this way rapid treatment of the coffee may be obtained in a much more uniform manner than by roasting the whole bean and with a loss of considerably less of the aromatic oils. This practice also forms part of the present invention and constitutes an alternate method.

Having thus fully described the invention, what I claim as new and desire to secure by Letters Patent is:

1. The herein described method which comprises grinding green coffee berries and thereafter cascading the resulting ground particles separated and free from static contact with one another and unobstructedly through a gaseous medium heated to a temperature to roast the particles, whereby they are individually enveloped in such medium and uniformly roasted thereby.

2. The herein described method which comprises grinding green coffee berries and thereafter cascading the resulting ground particles separated and free from static contact with one another and unobstructedly through a gaseous medium under pressure greater than atmospheric pressure and heated to a temperature to roast the particles, whereby they are individually enveloped in such medium and uniformly roasted thereby.

SAM EVERETT FINLEY.